(12) United States Patent
Fujiwara et al.

(10) Patent No.: US 12,085,171 B2
(45) Date of Patent: Sep. 10, 2024

(54) GLAND PACKING AND PACKING STRUCTURE

(71) Applicant: NIPPON PILLAR PACKING CO., LTD., Osaka (JP)

(72) Inventors: Masaru Fujiwara, Osaka (JP); Kodai Inoue, Osaka (JP)

(73) Assignee: NIPPON PILLAR PACKING CO., LTD., Osaka (JP)

( * ) Notice: Subject to any disclaimer, the term of this patent is extended or adjusted under 35 U.S.C. 154(b) by 215 days.

(21) Appl. No.: 17/286,175

(22) PCT Filed: Aug. 22, 2019

(86) PCT No.: PCT/JP2019/032797
§ 371 (c)(1),
(2) Date: Apr. 16, 2021

(87) PCT Pub. No.: WO2020/100369
PCT Pub. Date: May 22, 2020

(65) Prior Publication Data
US 2021/0348686 A1 Nov. 11, 2021

(30) Foreign Application Priority Data
Nov. 15, 2018 (JP) .................. 2018-214253

(51) Int. Cl.
*F16J 15/20* (2006.01)
*F16J 15/18* (2006.01)
*F16J 15/24* (2006.01)

(52) U.S. Cl.
CPC ............. *F16J 15/182* (2013.01); *F16J 15/20* (2013.01); *F16J 15/24* (2013.01)

(58) Field of Classification Search
CPC ............. F16J 15/182; F16J 15/20; F16J 15/24
See application file for complete search history.

(56) References Cited

U.S. PATENT DOCUMENTS 5,522,603 A * 6/1996 Naitou ................ F16J 15/30
277/539
5,573,253 A 11/1996 Naitou et al.
(Continued)

FOREIGN PATENT DOCUMENTS

| CN | 1120139 A | 4/1996 |
| CN | 102678926 A | 9/2012 |

(Continued)

OTHER PUBLICATIONS

Extended European Search Report for European Application No. 19883742.9, dated Jun. 27, 2022.
(Continued)

*Primary Examiner* — Vishal A Patel
(74) *Attorney, Agent, or Firm* — Birch, Stewart, Kolasch & Birch, LLP

(57) ABSTRACT

A gland packing includes a gland packing body made of expanded graphite. The gland packing body has a cylindrical shape, and has a plurality of layers formed in a radial direction. The gland packing body has first and second surfaces, which are both end surfaces in an axial direction. The gland packing further includes an annular first sheet portion made of expanded graphite, an annular second sheet portion made of expanded graphite, an annular first porous member, and an annular second porous member. The first sheet portion is arranged on the first surface. The second sheet portion is arranged on the second surface. The first porous member is arranged on the first sheet portion. The second porous member is arranged on the second sheet portion.

6 Claims, 6 Drawing Sheets

(56) References Cited

U.S. PATENT DOCUMENTS

| | | | | |
|---|---|---|---|---|
| 5,803,464 | A | * | 9/1998 | Ueda .................. F16J 15/30 277/528 |
| 6,299,976 | B1 | | 10/2001 | Tsukamoto |
| 2018/0080560 | A1 | | 3/2018 | Hashiguchi et al. |

FOREIGN PATENT DOCUMENTS

| CN | 203335856 U | | 12/2013 |
|---|---|---|---|
| CN | 105443760 A | | 3/2016 |
| CN | 207349429 U | | 5/2018 |
| JP | 3-788 A | | 1/1991 |
| JP | 4-41157 U | | 4/1992 |
| JP | 7-217745 A | | 8/1995 |
| JP | 8-219287 A | | 8/1996 |
| JP | 11-270690 A | | 10/1999 |
| JP | 2000-320681 A | | 11/2000 |
| JP | 2001336639 A | * | 12/2001 |
| JP | 2005-172128 A | | 6/2005 |
| JP | 4175525 B2 | | 11/2008 |
| JP | 2010-281380 A | | 12/2010 |
| JP | 2015129532 A | * | 7/2015 |
| WO | WO 2009/002231 A2 | | 12/2008 |
| WO | WO 2016/163220 A1 | | 10/2016 |

OTHER PUBLICATIONS

Indian Office Action for Indian Application No. 202117021814, dated Oct. 7, 2022, with English translation.
Chinese Office Action and Search Report for Chinese Application No. 201980075165.6, dated Dec. 9, 2022, with an English translation of the Chinese Office Action.
International Search Report, issued in PCT/JP2019/032797, PCT/ISA/210, dated Sep. 17, 2019.
Written Opinion of the International Searching Authority, issued in PCT/JP2019/032797, PCT/ISA/237, dated Sep. 17, 2019.

* cited by examiner

GLAND PACKING AND PACKING STRUCTURE

TECHNICAL FIELD

The present invention relates to a gland packing and a packing structure.

BACKGROUND ART

JP H7-217745A (Patent Literature 1) discloses a sealing device configured to seal a periphery of a movable shaft. This sealing device includes a plurality of gland packings (packing rings made of expanded graphite) each arranged around the movable shaft, and two adapter packings sandwiching the plurality of gland packings (see Patent Literature 1).

CITATION LIST

Patent Literature

Patent Literature 1: JP H7-217745A

SUMMARY OF INVENTION

Technical Problem

In the sealing device disclosed in Patent Literature 1, for example, when the movable shaft slides, expanded graphite (abrasion powder) caused by the gland packings is fixed to the movable shaft, and the expanded graphite fixed to the movable shaft is scraped off by the adapter packings. As a result, for example, the expanded graphite scraped off by the adapter packings may remain on the sliding surface between the movable shaft and the gland packings. When the expanded graphite remains on the sliding surface between the movable shaft and the gland packings, the expanded graphite wears the inner peripheral surfaces of the gland packings, and there is a possibility that the airtightness of the sealing device decreases.

Further, in the sealing device disclosed in Patent Literature 1, for example, when the lubricant is applied to the inner peripheral surfaces of the gland packings, the lubricant may flow out early from the sliding surface between the movable shaft and the gland packings due to the sliding of the movable shaft.

The present invention has been made to solve such problems, and an object of the present invention is to provide a gland packing and a packing structure capable of suppressing expanded graphite from remaining on a sliding surface between a movable shaft and the gland packing, and suppressing lubricant shortage on the sliding surface.

Solution to Problem

A gland packing according to an aspect of the present invention is to be arranged around a movable shaft. The gland packing includes a gland packing body made of expanded graphite. The gland packing body has a cylindrical shape, and has a plurality of layers formed in a radial direction thereof. The gland packing body has first and second surfaces, which are both end surfaces in an axial direction. The gland packing further includes an annular first sheet portion made of expanded graphite, an annular second sheet portion made of expanded graphite, an annular first porous member, and an annular second porous member. The first sheet portion is arranged on the first surface. The second sheet portion is arranged on the second surface. The first porous member is arranged on the first sheet portion. The second porous member is arranged on the second sheet portion.

The gland packing includes first and second porous members. Therefore, according to the gland packing, the expanded graphite generated on the sliding surface is absorbed by the first and second porous members, and thus it is possible to suppress the expanded graphite from remaining on the sliding surface. Further, according to the gland packing, when the lubricant is applied to the inner peripheral surfaces of the gland packing and the first and second porous members, the lubricant is held by the first and second porous members, and because the lubricant can be supplied from the first and second porous members to the sliding surface when the lubricant is insufficient on the sliding surface, lubricant shortage on the sliding surface can be suppressed. In the gland packing, because the plurality of layers are formed in the radial direction in the gland packing body, liquid can permeate in the axial direction of the movable shaft, but because the first and second sheet portions are respectively arranged on the first and second surfaces, permeation leakage in the axial direction of the movable shaft is suppressed.

In the above gland packing, the first and second sheet portions may be plane-symmetric with respect to a plane located between the first and second surfaces as a plane of symmetry.

In the gland packing, the first and second sheet portions are plane-symmetric with respect to the plane located between the first and second surfaces as a plane of symmetry. Therefore, according to the gland packing, even if the gland packing is inserted into the stuffing box from either side, the same sealing effect can be obtained. As a result, the installer of the gland packing can arrange the gland packing in the stuffing box without being conscious of the front and back of the gland packing.

In the gland packing, each of the first and second sheet portions may include first and second sheets, one of the first and second sheets may cover inner peripheral sides of the first and second surfaces, but not cover outer peripheral sides of the first and second surfaces, the other of the first and second sheets may cover the outer peripheral sides of the first and second surfaces, but not cover the inner peripheral sides of the first and second surfaces, and the first and second sheets may partially overlap each other.

In the gland packing, the inner peripheral sides of the first and second surfaces are covered by one of the first and second sheets, the outer peripheral sides of the first and second surfaces are covered by the other of the first and second sheets, and the first and second sheets partially overlap each other. Therefore, according to the gland packing, because the first surface and the second surface of the gland packing body are covered by the first sheet and the second sheet, it is possible to suppress permeation leakage in the axial direction of the movable shaft. Further, in the gland packing, one of the first and second sheets does not cover the outer peripheral sides of the both end surfaces in the axial direction of the gland packing body, and the other of the first and second sheets does not cover the inner peripheral sides of the both end surfaces in the axial direction of the gland packing body. That is to say, in the gland packing, the first and second sheets form steps on the inner peripheral side and the outer peripheral side of the gland packing body. According to the gland packing, one of the first and second sheets and the gland packing body are caught at the step, and the other of the first and second sheets and the porous members are caught at the step, and thus it is possible to further strengthen the joining of the respective portions.

In the gland packing, the first and second porous members may be metal mesh molded articles, and an inner diameter of one of the first and second sheets may be smaller than inner diameters of the first and second porous members.

In the gland packing, an inner periphery of one of the first and second sheets is smaller than inner diameters of the first and second porous members. Therefore, according to the gland packing, because the first and second sheets are positioned closer to the movable shaft, it is possible to reduce the likelihood that the first and second porous members, which are metal mesh molded articles, come into contact with the movable shaft. As a result, it is possible to reduce the likelihood that the first and second porous members, which are metal mesh molded articles, wear the movable shaft. In the gland packing, because the first and second porous members are made of metal and have high hardness, the gland packing body is less likely to protrude even when a fastening pressure is applied to the gland packing. As a result, according to the gland packing, a high fastening pressure can be maintained.

The gland packing may be impregnated with a lubricant.

A packing structure according to another aspect of the present invention is a structure in which a plurality of gland packings are arranged around a movable shaft. In this packing structure, each of the plurality of gland packings is the above gland packing.

Advantageous Effects of Invention

According to the present invention, it is possible to provide a gland packing and a packing structure capable of suppressing expanded graphite from remaining on the sliding surface between a movable shaft and the gland packing, and suppressing lubricant shortage on the sliding surface.

DESCRIPTION OF EMBODIMENTS

Figure 1:
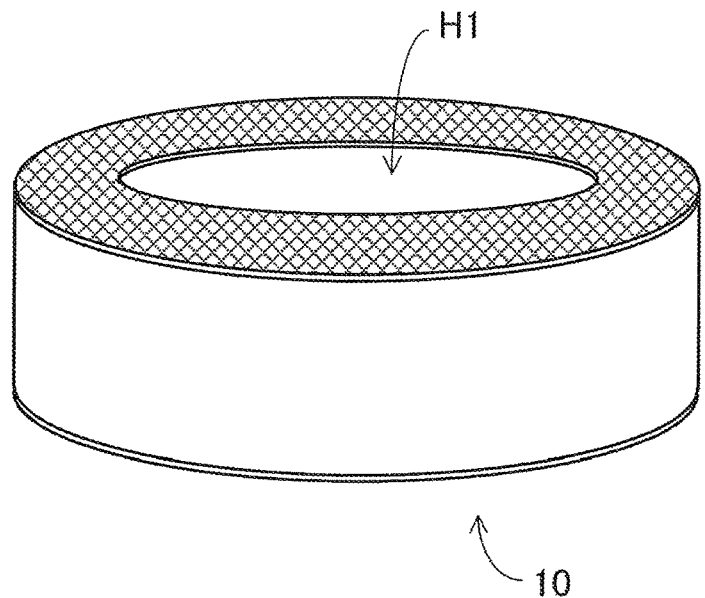
FIG. 1 is an external perspective view of a gland packing.

Hereinafter, an embodiment of the present invention will be described in detail with reference to the drawings. In the drawings, the same or corresponding parts are denoted by the same numerals, and description thereof will not be repeated.

1. Configuration of Gland Packing

FIG. 1 is an external perspective view of a gland packing 10 according to the present embodiment. The gland packing 10 is used, for example, to seal a through shaft (a movable shaft) of a valve or the like.

As shown in FIG. 1, the gland packing 10 has a ring shape. A hole H1 is formed in a central portion of the gland packing 10. The gland packing 10 is arranged around a movable shaft (not shown) by passing the movable shaft through the hole H1. Generally, a plurality of gland packings 10 are arranged around the movable shaft. In this manner, sealing of the movable shaft of the valve or the like is achieved.

Figure 2:
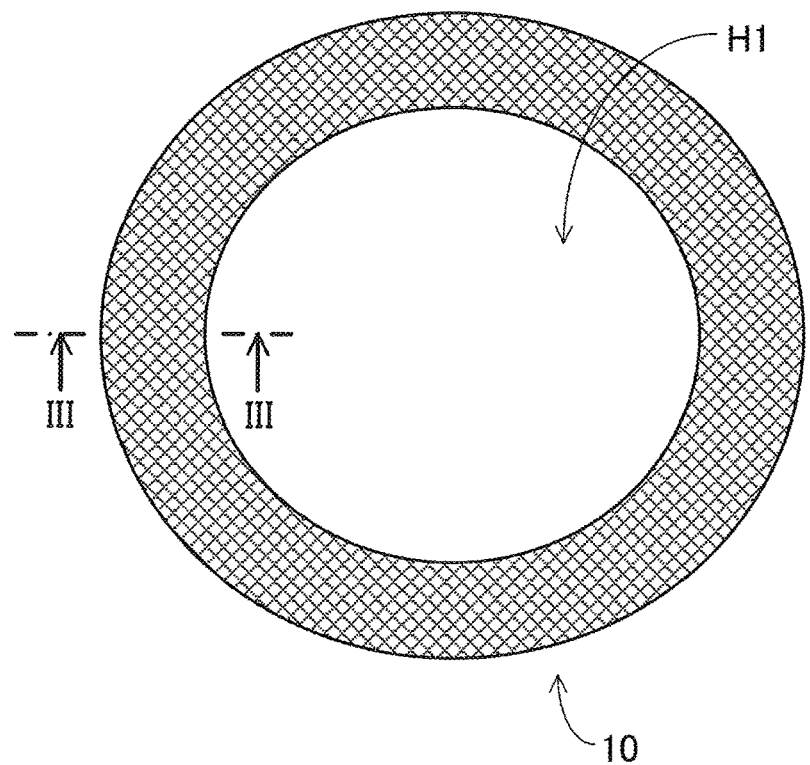
FIG. 2 is a plan view of the gland packing.
Figure 3:
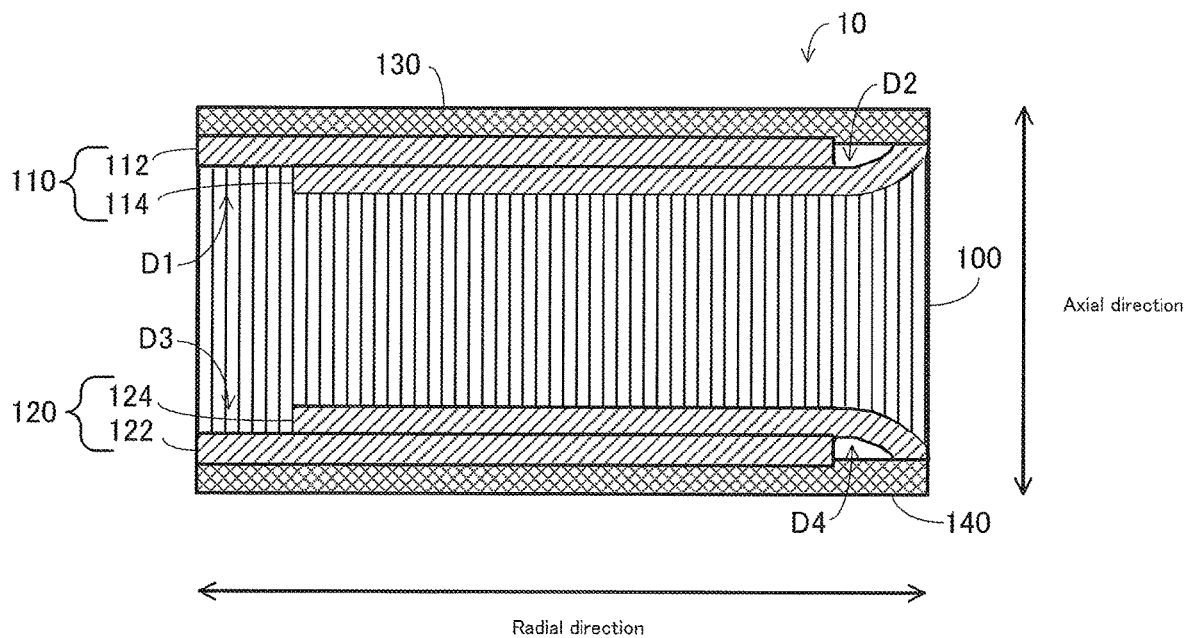
FIG. 3 is a cross-sectional view taken along line III-III of FIG. 2.

FIG. 2 is a plan view of the gland packing 10. FIG. 3 is a cross-sectional view taken along line III-III of FIG. 2. Referring to FIGS. 2 and 3, the gland packing 10 is configured by integrally molding a cylindrical gland packing body 100, annular sheet portions 110 and 120, and annular mesh molded articles 130 and 140.

The gland packing body 100 is made of expanded graphite. In the gland packing body 100, a plurality of layers are formed in the radial direction. Specifically, the gland packing body 100 is formed by spirally or concentrically winding an expanded graphite tape. That is to say, the plurality of layers are formed in the radial direction of the gland packing body 100 by winding and stacking the expanded graphite tape. In this expanded graphite tape, wrinkles extending in the longitudinal direction of the tape are formed at predetermined intervals in the width direction of the tape. By forming the wrinkles in advance, it is possible to control the position of the buckling point generated in the expanded graphite tape at the time of integral forming.

The sheet portion 110 includes expanded graphite sheets 112 and 114, and the sheet portion 120 includes expanded graphite sheets 122 and 124. The expanded graphite sheets 112, 114, 122, and 124 are made of expanded graphite. The expanded graphite sheet 112 and the expanded graphite sheet 122 have the same shape, and the expanded graphite sheet 114 and the expanded graphite sheet 124 have the same shape. The inner diameters of the expanded graphite sheets 112 and 122 are larger than the inner diameters of the expanded graphite sheets 114 and 124, respectively, and the outer diameters of the expanded graphite sheets 112 and 122 are larger than the outer diameters of the expanded graphite sheets 114 and 124, respectively.

The expanded graphite sheet 114 is arranged on one surface (upper surface) of the gland packing body 100, and the expanded graphite sheet 124 is arranged on the other surface (lower surface) of the gland packing body 100. The expanded graphite sheet 112 is arranged on the expanded graphite sheet 114, and the expanded graphite sheet 122 is arranged on the expanded graphite sheet 124. That is to say, in the gland packing body 100, the sheet portions 110 and 120 are plane-symmetric with respect to a plane positioned in the middle between the upper surface and the lower surface, which are both end surfaces in the axial direction of the gland packing body 100, as a plane of symmetry, among planes perpendicular to the axial direction of the movable shaft when the gland packing 10 is arranged around the movable shaft. Therefore, according to the gland packing 10, even if the gland packing 10 is inserted into a stuffing box from either side, the same sealing effect can be obtained. As a result, the installer of the gland packing 10 can arrange the gland packing 10 in the stuffing box without being conscious of the front and back of the gland packing 10.

In the gland packing 10, the expanded graphite sheets 114 and 124 cover inner peripheral sides (inner peripheral sides of the upper and lower surfaces) of both end surfaces in the axial direction of the gland packing body 100, and the expanded graphite sheets 112 and 122 cover outer peripheral sides (outer peripheral sides of the upper and lower surfaces) of both end surfaces in the axial direction of the gland packing body 100. The expanded graphite sheet 112 and the expanded graphite sheet 114 partially overlap each other, and the expanded graphite sheet 122 and the expanded graphite sheet 124 partially overlap each other. In the gland packing 10, because a plurality of layers are formed in the radial direction in the gland packing body 100, liquid can permeate in the axial direction of the movable shaft. However, according to the gland packing 10, because the upper surface and the lower surface of the gland packing body 100 are covered by the sheet portions 110 and 120, respectively, it is possible to suppress permeation leakage in the axial direction of the movable shaft (not shown). Also, according to the gland packing 10, as described above, the expanded graphite sheets 114 and 124 cover the inner peripheral sides of both end surfaces in the axial direction of the gland packing body 100, and the expanded graphite sheets 112 and 122 cover the outer peripheral sides of both end surfaces in the axial direction of the gland packing body 100. Accordingly, it is possible to suppress the gland packing body 100 (made of expanded graphite) from cutting into the mesh molded articles 130 and 140 during pressure molding in the manufacturing process of the gland packing 10.

In addition, in the gland packing 10, the expanded graphite sheets 114 and 124 do not cover the outer peripheral sides of both end surfaces in the axial direction of the gland packing body 100, and the expanded graphite sheets 112 and 122 do not cover the inner peripheral sides of both end surfaces in the axial direction of the gland packing body 100. That is to say, in the gland packing 10, steps D1 and D3 are formed on the outer peripheral sides of the gland packing body 100, and steps D2 and D4 are formed on the inner peripheral sides of the gland packing body 100. Note that the steps D2 and D4 are respectively formed between the expanded graphite sheets 114 and 124 and the expanded graphite sheets 112 and 122 that are curved during pressure molding. The sheet portions 110 and 120 and the gland packing body 100 are firmly joined to each other due to the gland packing body 100 being caught in the steps D1 and D3. In addition, the sheet portions 110 and 120 and the mesh molded articles 130 and 140 are firmly joined to each other due to the mesh molded articles 130 and 140 being caught in the steps D2 and D4.

The mesh molded articles 130 and 140 are annular and made of metal. The mesh molded articles 130 and 140 are produced by, for example, spirally winding a knitted metal wire, placing the spirally wound metal wire in a molding die, and performing pressure molding on the metal wire. The completed mesh molded articles 130 and 140 are porous and high-hardness members.

2. Packing Structure Using Gland Packings

Figure 4:
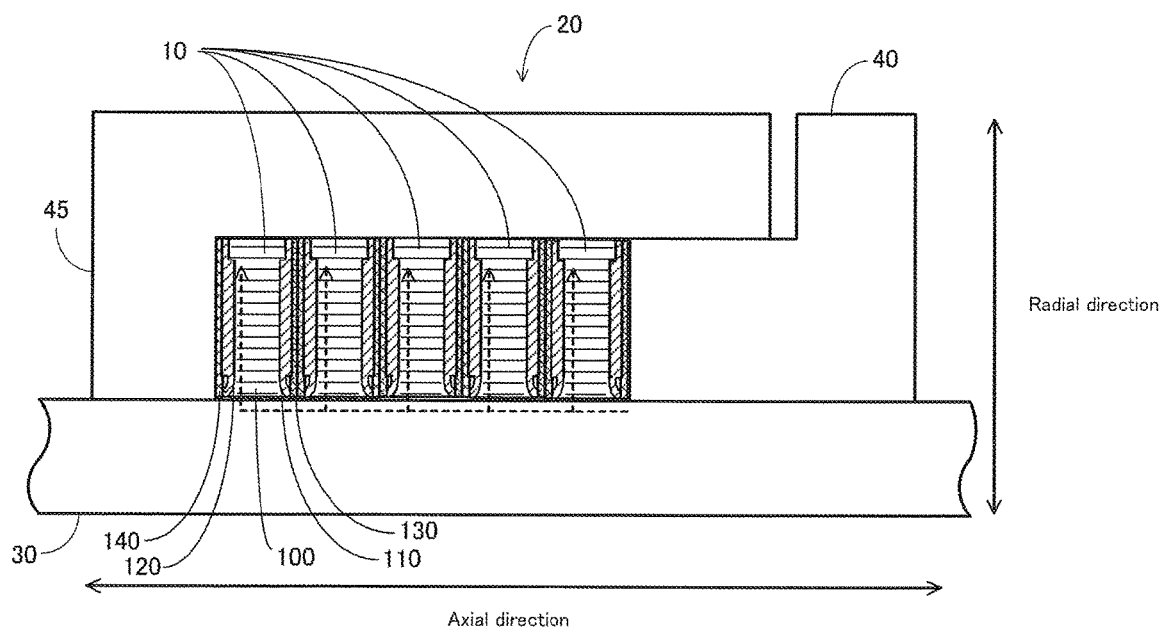
FIG. 4 is a diagram showing an example of a packing structure using the gland packings.

FIG. 4 is a diagram showing an example of a packing structure using the gland packings 10. As shown in FIG. 4, in a packing structure 20, five gland packings 10 are arranged in a stuffing box 45 formed around a movable shaft 30. In the stuffing box 45, the gland packings 10 are pressed in the axial direction by a gland holder 40. In this manner, the movable shaft 30 is sealed. In the gland packing 10, because the mesh molded articles 130 and 140 are made of metal and have high hardness, the gland packing body 100 is less likely to protrude even when a fastening pressure is applied to the gland packing 10. As a result, according to the gland packing 10, a high fastening pressure can be maintained.

When the movable shaft 30 slides in the axial direction, for example, expanded graphite (abrasion powder) caused by the gland packing body 100 may adhere to the movable shaft 30. If the expanded graphite remains on the sliding surface between the gland packing 10 and the movable shaft 30, the expanded graphite wears the inner peripheral surfaces of the gland packing 10, and airtightness in the packing structure 20 decreases. However, in the packing structure 20, the mesh molded articles 130 and 140 are porous, and the mesh molded articles 130 and 140 can absorb the expanded graphite generated on the sliding surface. That is to say, according to the packing structure 20, because the expanded graphite generated on the sliding surface is discharged to the outside of the sliding surface by the mesh molded articles 130 and 140, it is possible to suppress the expanded graphite from remaining on the sliding surface. In particular, when a lubricant (for example, a hydrocarbon-based lubricant) is applied to the sliding surface, the expanded graphite moves to the depth side (outer peripheral side) in the radial direction of the mesh molded articles 130 and 140 along with the flow of the lubricant entering the mesh molded articles 130 and 140 side. This allows the mesh molded articles 130 and 140 to hold more expanded graphite.

In the gland packing 10, when the lubricant is applied to the inner peripheral surfaces of the gland packing 10 and the mesh molded articles 130 and 140, the lubricant is held by the mesh molded articles 130 and 140. Therefore, according to the gland packing 10, when the lubricant is insufficient on the sliding surface, the lubricant can be supplied from the mesh molded articles 130 and 140 to the sliding surface, and thus it is possible to suppress lubricant shortage on the sliding surface.

In order to maintain the strength of the mesh molded articles 130 and 140 and appropriately hold the lubricant and the expanded graphite, the porosity of the mesh molded articles 130 and 140 is preferably 50 to 70%.

3. Method for Manufacturing Gland Packing

Figure 5:
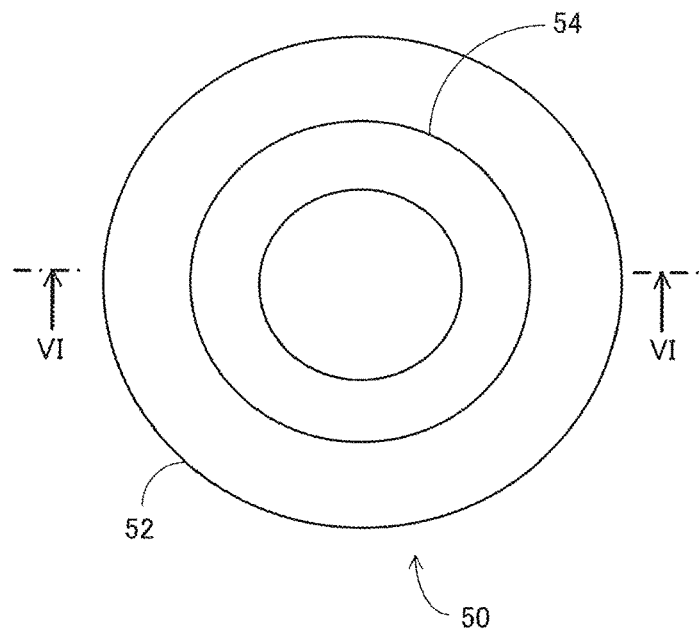
FIG. 5 is a plan view of a mold used for manufacturing the gland packing.
Figure 6:
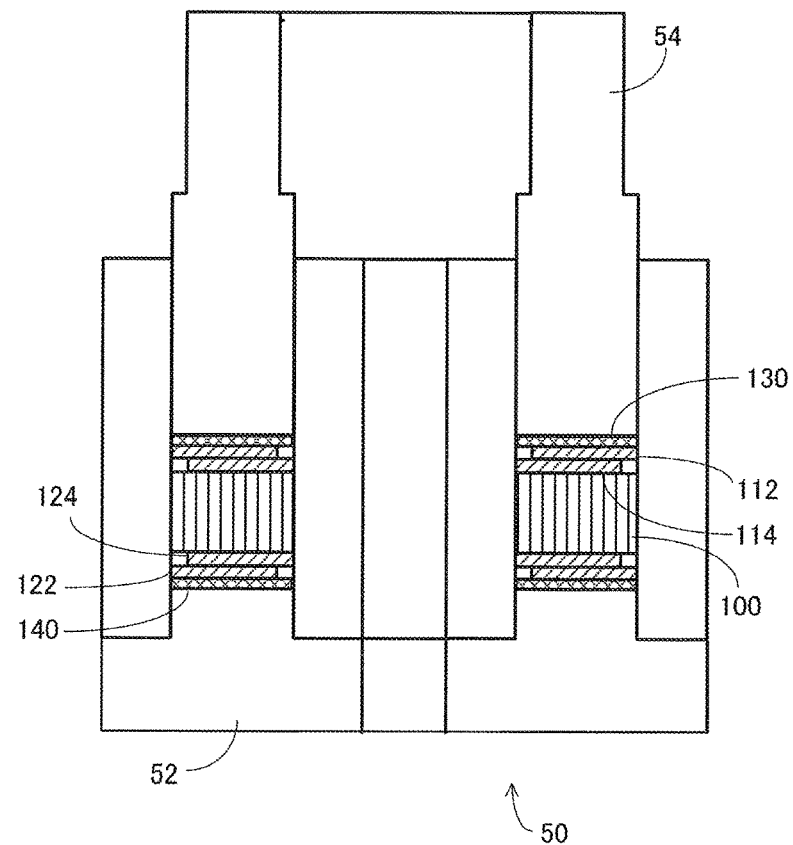
FIG. 6 is a cross-sectional view taken along line VI-VI of FIG. 5.

FIG. 5 is a plan view of a mold 50 used for manufacturing the gland packing 10. FIG. 6 is a cross-sectional view taken along line VI-VI of FIG. 5. FIG. 6 shows a state in which materials are arranged in the mold 50 and before pressure molding. As shown in FIGS. 5 and 6, the mold 50 includes a material holding portion 52 and a pressuring portion 54. A plurality of types of materials are arranged at predetermined positions of the material holding portion 52, and the plurality of types of materials are pressed by the pressuring portion 54. In this manner, the plurality of types of materials are integrally molded.

Figure 7:
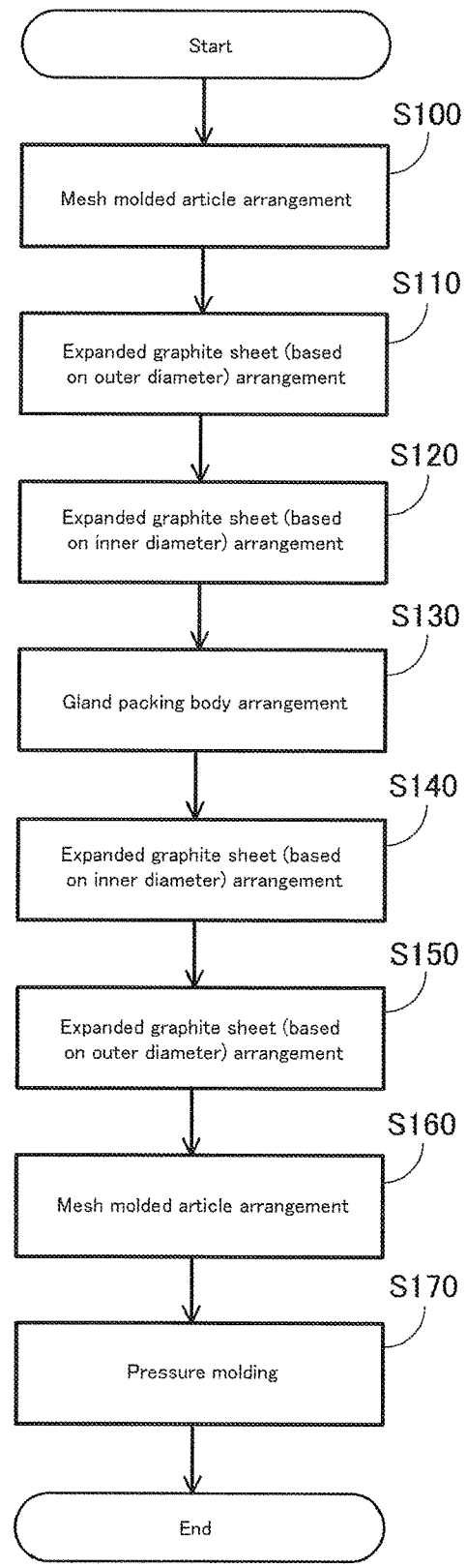
FIG. 7 is a flowchart showing a manufacturing procedure of the gland packing.

FIG. 7 is a flowchart showing a manufacturing procedure of the gland packing 10. The processing shown in this flowchart is executed by, for example, a manufacturing apparatus of the gland packing 10.

Referring to FIGS. 5, 6, and 7, the manufacturing apparatus arranges the mesh molded article 140 on the material holding portion 52 (step S100). The manufacturing apparatus arranges the expanded graphite sheet 122 on the mesh molded article 140 (step S110). The manufacturing apparatus arranges the expanded graphite sheet 124 on the expanded graphite sheet 122 (step S120). The manufacturing apparatus arranges the gland packing body 100 on the expanded graphite sheet 124 (step S130). The manufacturing apparatus arranges the expanded graphite sheet 114 on the gland packing body 100 (step S140). The manufacturing apparatus arranges the expanded graphite sheet 112 on the expanded graphite sheet 114 (step S150). The manufacturing apparatus arranges the mesh molded article 130 on the expanded graphite sheet 112 (step S160). Thereafter, the manufacturing apparatus presses the pressuring portion 54 to perform pressure molding of the materials (step S170). In this manner, the gland packing 10 is manufactured.

4. Features

As described above, the gland packing 10 includes the mesh molded articles 130 and 140. Therefore, according to the gland packing 10, because the expanded graphite generated on the sliding surface is absorbed by the mesh molded articles 130 and 140, it is possible to suppress the expanded graphite from remaining on the sliding surface. According to the gland packing 10, when the lubricant is applied to the inner peripheral surfaces of the gland packing 10 and the mesh molded articles 130 and 140, the lubricant is held by the mesh molded articles 130 and 140, and when the lubricant is insufficient on the sliding surface, the lubricant can be supplied from the mesh molded articles 130 and 140 to the sliding surface. Accordingly, it is possible to suppress lubricant shortage on the sliding surface. In the gland packing 10, because the plurality of layers are formed in the radial direction in the gland packing body 100, liquid can permeate in the axial direction of the movable shaft. However, because the sheet portions 110 and 120 are arranged on both surfaces of the gland packing body 100, permeation leakage in the axial direction of the movable shaft is suppressed.

5. Modified Examples

Although the embodiment has been described above, the present invention is not limited to the above embodiment, and various modifications can be made without departing from the sprit thereof. Modified examples will be described below. However, the following modified examples can be combined as appropriate.

5-1

In the above embodiment, the inner diameters of the gland packing body 100 and the expanded graphite sheets 114 and 124 are substantially the same as the inner diameters of the mesh molded articles 130 and 140. However, the relationship between the inner diameters of the respective members is not limited thereto.

Figure 8:
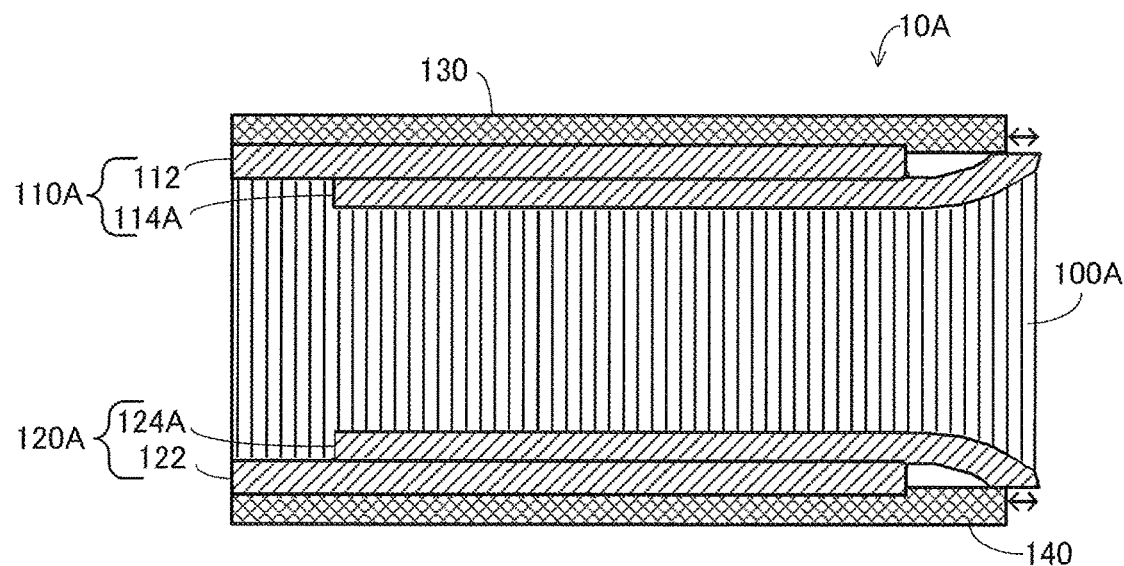
FIG. 8 is a diagram showing a cross section of a gland packing in a modified example.

FIG. 8 is a diagram showing a cross section of a gland packing 10A in a modified example. As shown in FIG. 8, for example, the inner diameters of a gland packing body 100A and expanded graphite sheets 114A and 124A may be smaller than the inner diameters of the mesh molded articles 130 and 140. That is to say, the inner peripheries of the expanded graphite sheets 114A and 124A may be shorter than the inner peripheries of the mesh molded articles 130 and 140. According to the gland packing 10A, because the gland packing body 100A and the expanded graphite sheets 114A and 124A are positioned closer to the movable shaft, it is possible to reduce the likelihood that the metallic mesh molded articles 130 and 140 come into contact with the movable shaft. As a result, it is possible to reduce the likelihood that the metal mesh molded articles 130 and 140 wear the movable shaft.

5-2

In the above embodiment, the expanded graphite sheets 114 and 124 having a small inner diameter and a small outer diameter are arranged at positions close to the gland packing body 100, and the inner and outer expanded graphite sheets 112 and 122 having a large inner diameter and a large outer diameter are arranged at positions far from the gland packing body 100. However, the positions of the expanded graphite sheets are not limited thereto. For example, the expanded graphite sheets 114 and 124 having small inner and outer diameters may also be arranged at positions far from the gland packing body 100, and the inner and outer expanded graphite sheets 112 and 122 having large inner and outer diameters may also be arranged at positions close to the gland packing body 100.

5-3

In the above embodiment, the mesh molded articles 130 and 140 are made of metal. However, the mesh molded articles 130 and 140 are not necessarily made of metal. The mesh molded articles 130 and 140 may also be made of, for example, carbon fiber, carbon fiber, alumina, ceramic filter, or the like. That is to say, the mesh molded articles 130 and 140 may be made of a member that is more porous and harder than the gland packing body 100.

6. Examples and the Like

Examples will be described below.

6-1. Examples

Mesh Molded Article

A metallic wire having a wire size (diameter) of 0.15 mm was used and knitted so as to have a width of 16 mm. 1.4 g of knitted metallic wire was prepared. The prepared metallic wire was placed in a mold having an inner diameter of 24 mm and an outer diameter of 37 mm in a helical shape. Thereafter, pressure molding was performed at a molding surface pressure of 40 N/mm². As a result, a molded article having a thickness of 0.75 mm was completed. Two mesh molded articles were prepared in the same manner.

Expanded Graphite Sheet

Two expanded graphite sheets were prepared by punching an expanded graphite sheet having a thickness of 0.75 mm with a punching die having an inner diameter of 24 mm and an outer diameter of 35 mm. In addition, two expanded graphite sheets were prepared by punching an expanded graphite sheet having a thickness of 0.75 mm with a punching die having an inner diameter of 26 mm and an outer diameter of 37 mm.

Gland Packing Body 4.29 g of expanded graphite sheet (tape) with a thickness of 0.38 mm and a width of 14 mm, which was formed with a depth of 0.3 mm so as to extend in the sheet longitudinal direction at intervals of 2 mm in the sheet width direction, was prepared. The gland packing body was prepared by winding the expanded graphite sheet.

Gland Packing

According to the procedure shown in FIG. 7, the materials were placed in the mold, and then subjected to pressure molding at a molding surface pressure of 40 N/mm². Thereafter, the pressure-molded article was subjected to an impregnation treatment with a hydrocarbon lubricant. Then, the molded article was dried at 80 degrees for four hours.

6-2. Comparative Example

A gland packing similar to the gland packing disclosed in JP H7-217745 was prepared.

6-3. Test and Result

Figure 9:
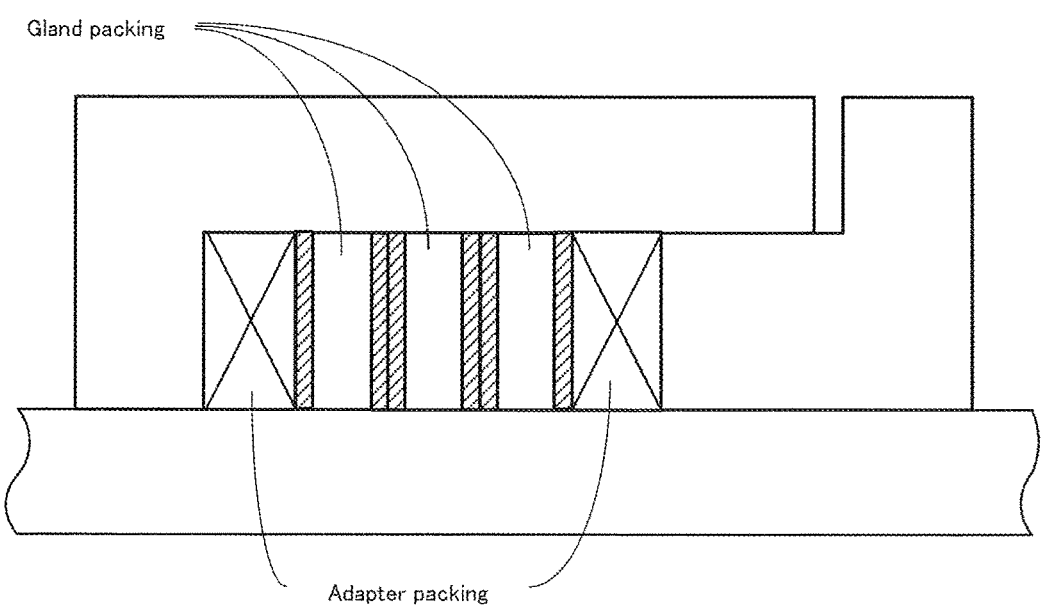
FIG. 9 is a diagram showing an arrangement of gland packings in a comparative example.

The gland packings according to the example were arranged as shown in FIG. 4, and the gland packings according to the comparative example were arranged as shown in FIG. 9. In the example and the comparative example, the movable shaft sealed by the gland packing was slid in the axial direction, and the amount of fluid leakage was measured. The test fluid pressure was 25.9 MPa, the test temperature was room temperature, and the test fluid was helium gas. The test procedure was according to ISO 15848-1 (2015).

Figure 10:
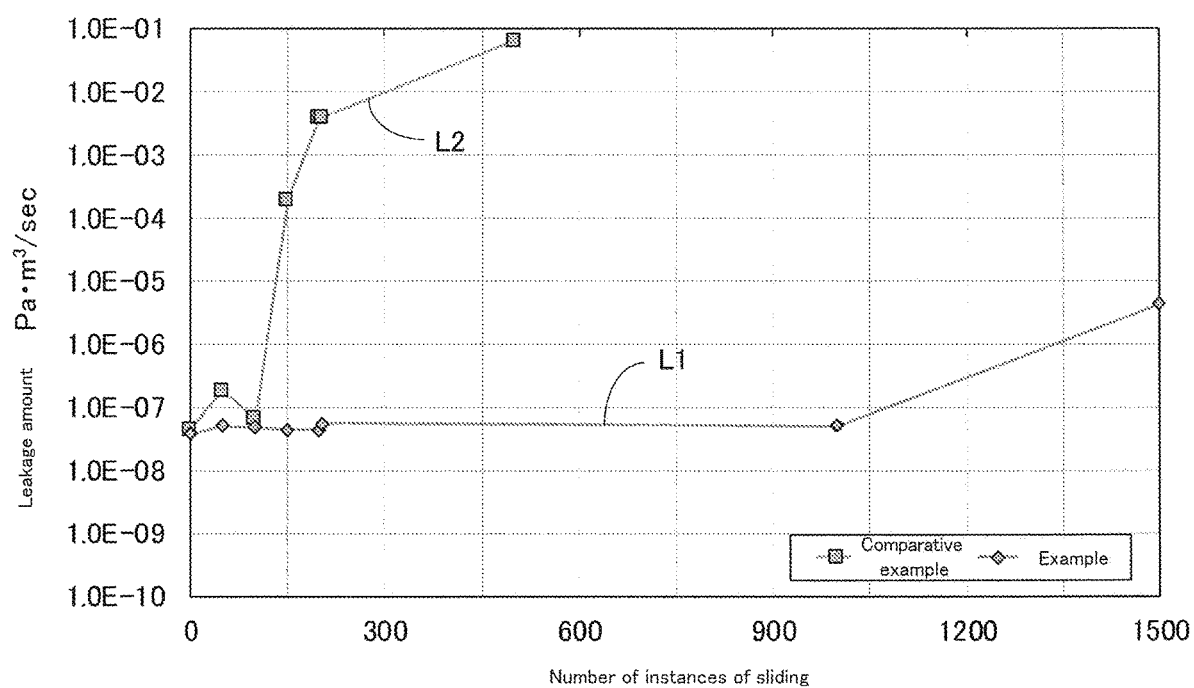
FIG. 10 is a diagram showing a test result.

FIG. 10 shows the test result. Referring to FIG. 10, the horizontal axis represents the number of instances of sliding, and the vertical axis represents the amount of fluid leakage. It was confirmed that the leakage amount (L2) of the example was improved compared to the leakage amount (L1) of the comparative example.

LIST OF REFERENCE NUMERALS

- 10 Gland packing
- 20 Packing structure
- 30 Movable shaft
- 40 Gland holder
- 45 Stuffing box
- 50 Mold
- 52 Material holding portion
- 54 Pressuring portion
- 100 Gland packing body
- 110, 120 Sheet portion
- 112, 114, 122, 124 Expanded graphite sheet
- 130, 140 Mesh molded article

The invention claimed is:

1. A gland packing structure to be arranged around a movable shaft, comprising:
    a gland packing body made of expanded graphite, the gland packing body being cylindrical and having a plurality of layers formed in a radial direction, and defining an inner diameter and an outer diameter,
    wherein the gland packing body has first and second surfaces, which are both end surfaces in an axial direction, and
    the gland packing structure further includes:
        an annular first sheet portion that is made of expanded graphite different from the expanded graphite of the gland packing body, the annular first sheet portion being arranged on the first surface of the gland packing body;
        an annular second sheet portion that is made of expanded graphite different from the expanded graphite of the gland packing body, the annular second sheet portion being arranged on the second surface of the gland packing body;
        an annular first porous member arranged on the first sheet portion; and
        an annular second porous member arranged on the second sheet portion,
    wherein each of the first and second sheet portions includes a first sheet, and the first sheet covers inner peripheral sides of the first and second surfaces, but does not cover outer peripheral sides of the first and second surfaces, and
    wherein an outer end face of the first sheet is covered by the gland packing body in the radial direction, and each of the annular first and second porous members extends from the inner diameter of the gland packing body to the outer diameter of the gland packing body.

2. The gland packing structure according to claim 1, wherein the first and second sheet portions are plane-symmetric with respect to a plane located between the first and second surfaces as a plane of symmetry.

3. The gland packing structure according to claim 1, wherein
    each of the first and second sheet portions includes a second sheet,
    the second sheet covers the outer peripheral sides of the first and second surfaces, but does not cover the inner peripheral sides of the first and second surfaces, and
    the first and second sheets partially overlap each other.

4. The gland packing structure according to claim 3, wherein
    the first and second porous members are metal mesh molded articles, and
    an inner diameter of one of the first and second sheets is smaller than inner diameters of the first and second porous members.

5. The gland packing structure according to claim 1, wherein the gland packing is impregnated with a lubricant.

6. A packing structure in which a plurality of gland packing structures are arranged around a movable shaft, wherein each of the plurality of gland packing structures is the gland packing structure according to claim 1.

* * * * *